United States Patent
Wagels

(10) Patent No.: US 7,465,236 B2
(45) Date of Patent: Dec. 16, 2008

(54) FLYING ARRANGEMENT

(75) Inventor: Dieter Wagels, Geilenkirchen (DE)

(73) Assignee: Dieter Wagels, Geilenkirchen (DE)

( * ) Notice: Subject to any disclaimer, the term of this patent is extended or adjusted under 35 U.S.C. 154(b) by 0 days.

(21) Appl. No.: 10/528,886

(22) PCT Filed: Sep. 25, 2003

(86) PCT No.: PCT/EP03/10659

§ 371 (c)(1), (2), (4) Date: Mar. 23, 2005

(87) PCT Pub. No.: WO2004/030783

PCT Pub. Date: Apr. 15, 2004

(65) Prior Publication Data

US 2006/0058106 A1    Mar. 16, 2006

(30) Foreign Application Priority Data

Sep. 27, 2002   (DE)   ................   102 45 351

(51) Int. Cl.
A63G 31/16   (2006.01)
A63G 1/00    (2006.01)

(52) U.S. Cl. ................ 472/130; 472/59; 434/34

(58) Field of Classification Search ............ 472/59, 472/60, 130, 131, 136, 137; 434/34, 35, 434/55

See application file for complete search history.

(56) References Cited

U.S. PATENT DOCUMENTS

| | | | |
|---|---|---|---|
| 1,841,321 A * | 1/1932 | Arnstein et al. | 52/65 |
| 3,506,221 A | 4/1970 | Caillette et al. | |
| 3,676,964 A | 7/1972 | Anglade, Jr. | |
| 3,752,419 A | 8/1973 | Richter | |
| 3,933,325 A | 1/1976 | Kaelin | |
| 4,487,410 A * | 12/1984 | Sassak | 472/131 |
| 4,941,628 A | 7/1990 | Salamoto et al. | |
| 5,410,488 A * | 4/1995 | Andersen, III | 702/158 |
| 5,522,192 A | 6/1996 | Frantl et al. | |
| 5,531,644 A * | 7/1996 | Marumo | 472/68 |
| 5,669,821 A * | 9/1997 | Prather et al. | 472/59 |
| 5,716,281 A * | 2/1998 | Dote | 472/60 |
| 5,842,667 A * | 12/1998 | Jones | 244/114 R |
| 5,996,933 A | 12/1999 | Schier | |
| 6,053,451 A | 4/2000 | Yu | |
| 6,119,983 A | 9/2000 | Provitola | |
| 6,134,849 A * | 10/2000 | Holler | 52/80.1 |

(Continued)

FOREIGN PATENT DOCUMENTS

FR    2 546 217    11/1984

(Continued)

OTHER PUBLICATIONS

International Search Report, PCT/EP03/10659.

(Continued)

Primary Examiner—Kien T Nguyen
(74) Attorney, Agent, or Firm—Fay Sharpe LLP

(57) ABSTRACT

A flying arrangement, consisting of at least one flying unit (10) that is able to start vertically and that can accommodate at least one person for flying freely within at least a hall (100,200), the boundaries (2,3,4,5,6) of which prevent a flying unit (10) from leaving the hall (100,200,300).

22 Claims, 3 Drawing Sheets

U.S. PATENT DOCUMENTS

| | | | |
|---|---|---|---|
| 6,382,557 B1 | 5/2002 | Lafuma et al. | |
| 6,411,890 B1 * | 6/2002 | Zimmerman | 701/120 |
| 6,719,563 B2 * | 4/2004 | Donges | 434/29 |
| 6,752,720 B1 * | 6/2004 | Clapper et al. | 463/58 |
| 6,796,908 B2 * | 9/2004 | Weston | 472/43 |
| 6,837,456 B1 * | 1/2005 | Shih et al. | 244/12.1 |
| 6,965,816 B2 * | 11/2005 | Walker | 701/16 |

FOREIGN PATENT DOCUMENTS

| | | |
|---|---|---|
| GB | 921398 | 3/1963 |
| GB | 934169 | 8/1963 |

OTHER PUBLICATIONS

Welt Am Sonntag, Push the Button and Lift Off, Aug. 18, 2002, No. 33.

* cited by examiner

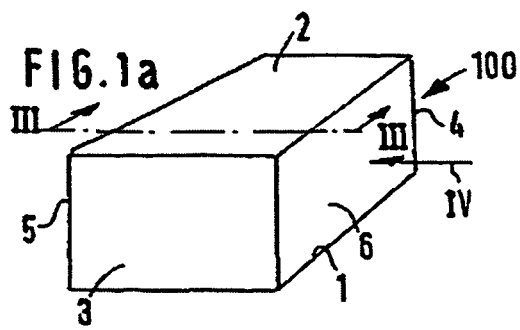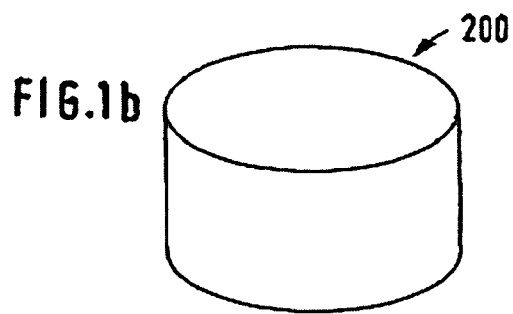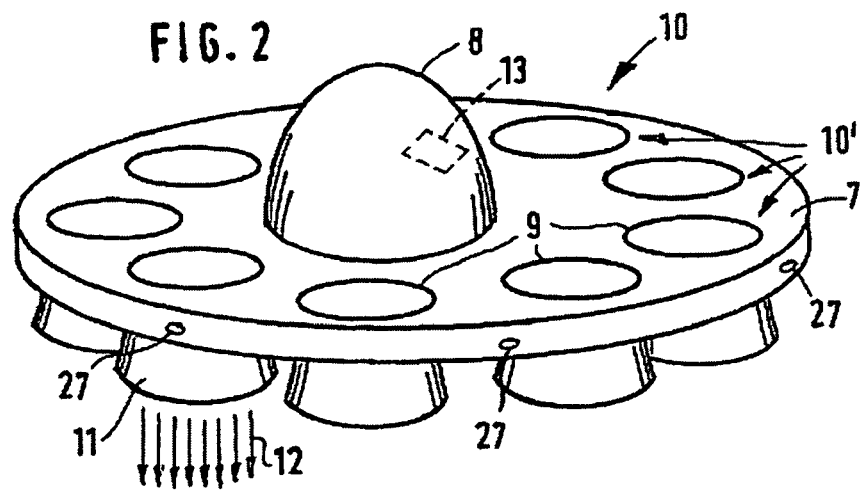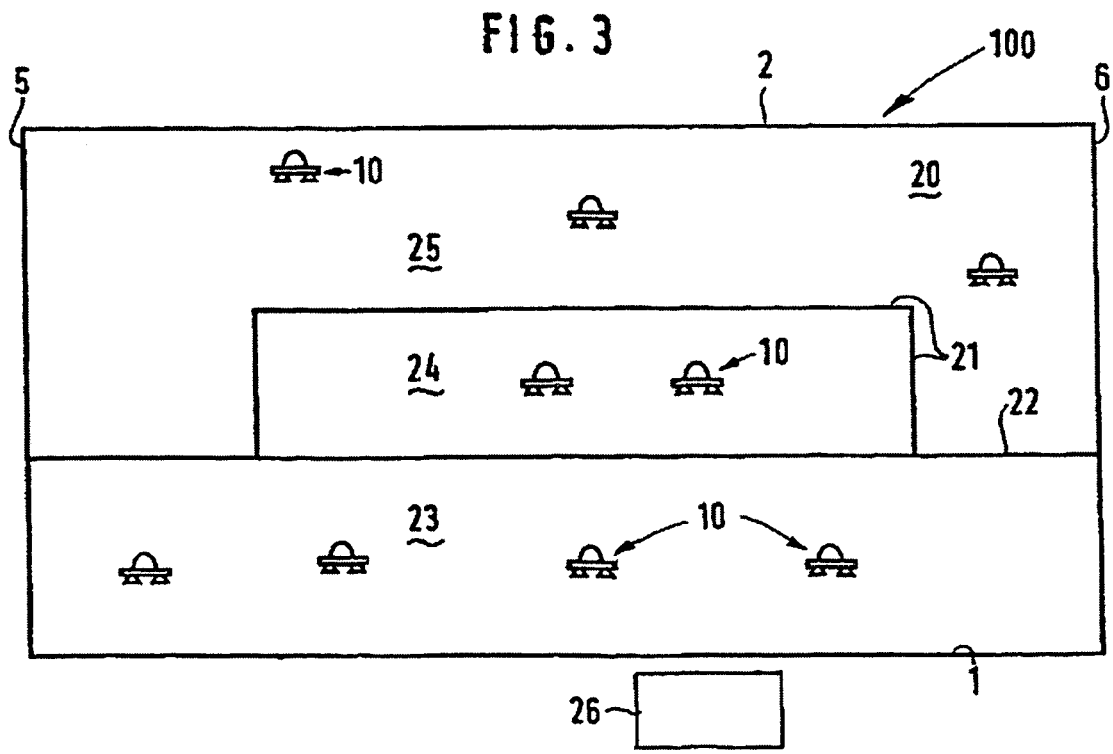

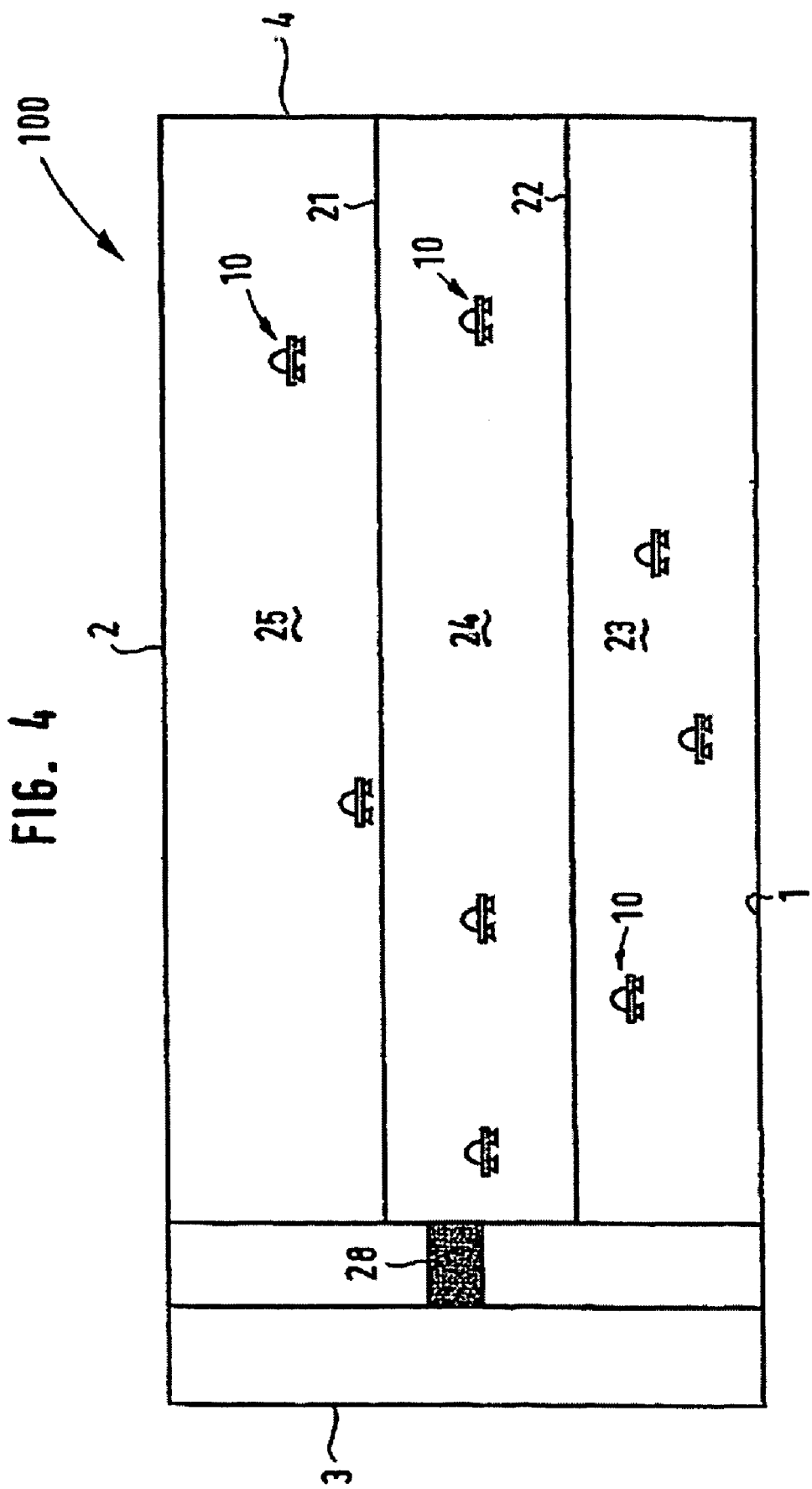

FLYING ARRANGEMENT

CROSS-REFERENCE TO RELATED APPLICATIONS

This application is a national stage entry of international application number PCT/EP2003/010659, having international filing date Sep. 25, 2003, which was not published in English, and which claims priority to German patent application No. DE102 45 351.9, filed Sep. 27, 2002.

FIELD OF THE INVENTION

The invention relates to amusement rides and more particularly to flying arrangement amusement park rides.

BACKGROUND OF THE INVENTION

Amusement park rides that give the participant a feeling of being airborne or of flying are known as carnival attractions. The known flying arrangements, however, are constructed in such a manner that the participant or user does not have the opportunity to be actively involved while he uses such amusement park rides. Instead, he is forced to sit in a seat which is forcibly controlled and follows a fixed path, e.g., on rails as on a roller coaster, on a vertical column or on rods. Thus, the participant can only take a ride but he cannot determine the course of the event on his own. He cannot actively influence the trajectory path or the airborne process.

The problem to be solved by the present invention is to make available a flying arrangement that allows the participant to actively participate in the flying or airborne experience. This includes not only amusement park arrangements but, in particular, also arrangements for training motor and mental abilities that are essential so as to be able to master flying arrangements.

SUMMARY OF THE INVENTION

To solve this problem, a flying arrangement is proposed.

The flying arrangement thus comprises a hall and a minimum of one free-flying unit that is preferably able to accommodate one but possibly also two or even more persons, which can start vertically and which can then fly freely around the hall.

The hall is designed so that its boundaries prevent a flying unit from leaving the hall while flying. This can be implemented by providing the hall with closed walls and a closed ceiling. It is, however, not absolutely necessary that the boundaries be solidly closed. The boundaries can also be defined by a wire lattice so that the hall so-to-speak forms a cage for the flying units. It is not even necessary for the boundaries to be defined by mechanical means. To prevent a flying unit from leaving a circumscribed area, even a remote control could be used. Thus, upon approaching, e.g., this type of a vertical boundary, a flying unit could be forcibly turned aside or lowered.

The term "hall" includes structures of the most varied geometries as long as they can suitably accommodate the free flying units. The simplest and economically most advantageous shape is that of a structure that is convex on all sides, in particular of a structure in the shape of a rectangle with flat rectangular side faces; boundary areas that are not flat, e.g., round, upright boundary areas are, however, possible as well.

The structures need not be convex on all sides. One possibility under consideration is that of a flying tunnel design, in particular with self looping flying tunnels in which the flying units can fly within closed paths.

It is also possible to combine a number of halls of different types.

To ensure that the feeling of free flight is sufficiently pronounced, the flying units and the hall have a certain size ratio relative to one another so that the flying units are sufficiently mobile and do not approach the boundaries too soon. For example, a hall in the shape of a rectangle can be dimensioned so that it is twenty or thirty times longer and higher than one single flying unit alone. The horizontal dimensions of the hall will frequently be limited not only by the economically feasible size, but also by the space available for such a hall in an amusement park or a similar facility.

The flying units will be primarily designed to accommodate one person. To maintain the correct size ratio with respect to a practically implementable hall, they should not be excessively large, i.e., they should not have the size of a small airplane. Flying units of this type are known from the prior art. Thus, for example, during the opening of the Olympic Games in Los Angeles, a pilot with a rocket-powered flying unit floated into the stadium. How close such flying units are to being commercially implemented is apparent from an article entitled "Push the button and lift off" that was published in the weekly magazine "WELT am SONNTAG," No. 33, Aug. 18, 2002.

The present invention is suitable not only as an attraction for an amusement park or a carnival with the purpose of selling rides, but also as a permanently stationary installation similar to that of a go-cart track. Furthermore, the invention does not have only an amusement or entertainment value, but can also be used as a tool for flight training with flying units of the type related to sports or professional purposes.

The flying unit can be designed in the form of a flying disk with a platform, in the center of which space for the person is provided and which also has a lifting unit assembly. Such a platform can have a diameter of approximately 3-5 m so as to be able to accommodate a sufficiently powerful lifting unit assembly on it.

The lifting unit assembly could comprise a plurality of separate lifting units distributed around the center and able to trigger a lifting effect that is distributed uniformly around the center.

A uniform lifting effect is necessary to hold the platform in the horizontal plane. The uniform lifting effect is achieved by means of a suitable control.

In the preferred practical example of the invention, the lifting units, when in operation, are vertically downward operating blowers that, in the practical example, can be electrically driven, for example, in such a manner that the power for the drive is supplied by detection loops in the hall.

To drive the lifting units, the alternate practical example provides for fuel burning motors to be included and disposed on the platform. Another alternative is that the lifting units are designed in the form of rocket boosters.

An important feature of the invention is that at least one flying unit has a position-detection device so that the position inside the hall can be determined at any time.

This is a prerequisite so as to ensure that the flying unit can be controlled by means of a remote control device, either to avoid a collision of the flying unit with other flying units or with a boundary of the hall, regardless of its design, or to be able, if necessary, to return certain flying units to the ground.

The hall can comprise a minimum of two zones, and flying with a flying unit can be restricted to one zone or to specific zones, for example, for beginners, to a low zone near the ground level.

It is recommended that, to exclude the risk of collisions, at least one flying unit be equipped with distance sensors that are connected to the remote control device.

BRIEF DESCRIPTION OF THE DRAWINGS

In the drawings, practical examples of the flying unit according to the present invention are shown as diagrammatic representations.

FIGS. 1a and 1b show the contours of the types of halls to be considered;

FIG. 2 shows a perspective view of one single flying unit;

FIG. 3 shows a sectioned front view of the hall according to FIG. 1a approximately along line III-III in FIG. 1a;

FIG. 4 shows a lateral view of the hall according to FIG. 1a in the direction of arrow IV in FIG. 1a.

DETAILED DESCRIPTION OF THE INVENTION

Figure 5:
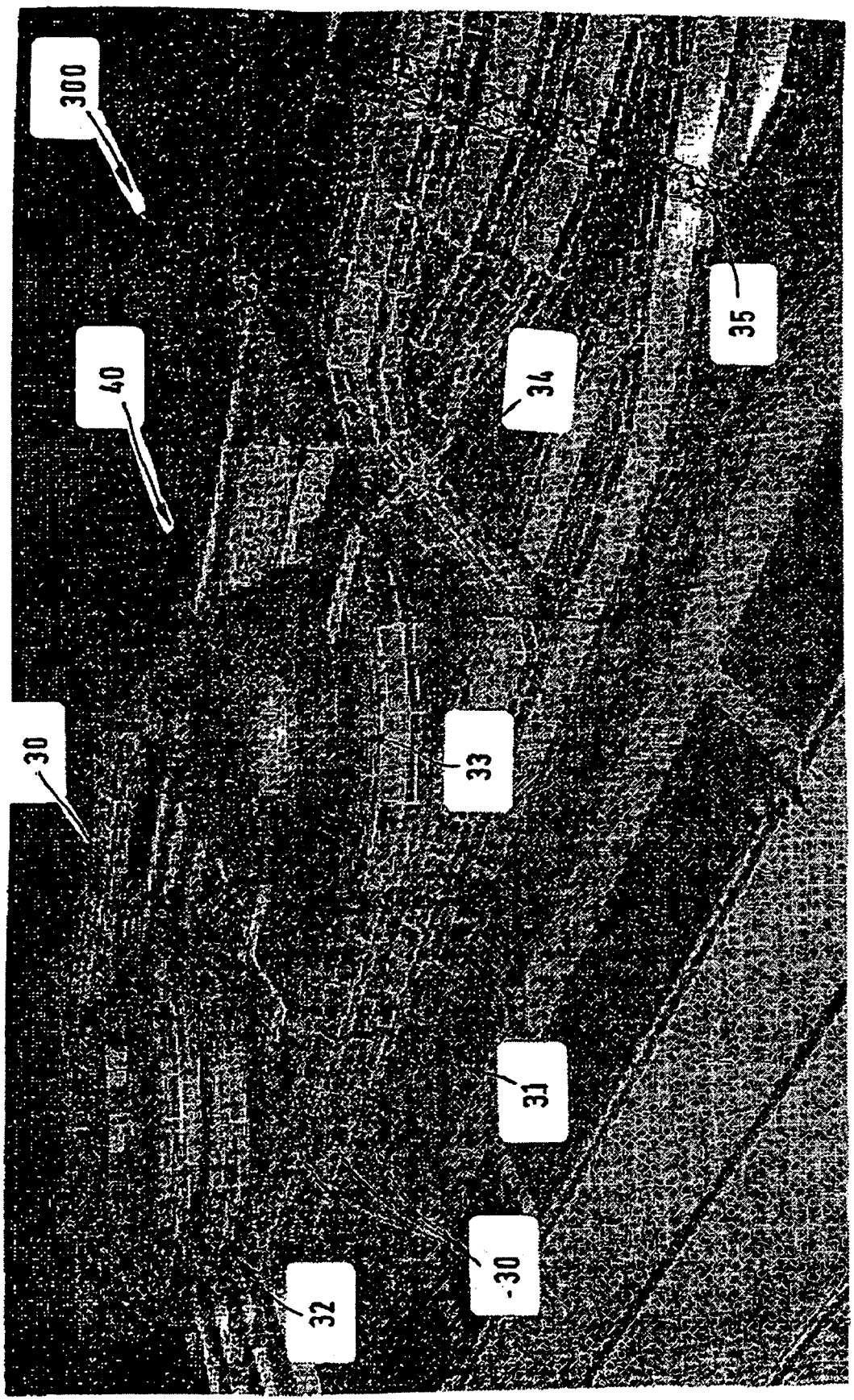
FIG. 5 shows a perspective sectioned view of a model of a flying tunnel assembly.

The hall, which in its entirety is designated by 100 in FIG. 1a, has a rectangle shape with a ground 1, a ceiling 2, two shorter rectangular side faces 3 and 4 and two longer side faces 5 and 6. Side faces 2 to 6 form boundaries that can be designed as closed walls, thus preventing the flying units 10 (FIG. 2) flying inside said hall from leaving hall 100, or as "electronic walls" that interact with the control of flying unit 10, so as to prevent said flying unit from leaving the rectangular space.

The rectangular shape is only one specific practical example. FIG. 1b shows an alternative practical example 200 of a hall that has the shape of an upright cylinder section, FIG. 5 shows hall 300 that is designed in the form of a flying tunnel assembly 40.

FIG. 2 shows one single flying unit 10 which, in this particular practical example, is designed in the form of a flying disk and comprises a platform 7 with a circular cross section, in the center of which a cupola 8 made of a transparent material, such as Plexiglas, is located, which cupola, during operation of flying unit 10, accommodates the person. Uniformly distributed on a circular area all around the cupola 8 are nine lifting units 10' in the form of lifting blowers 9 with downwardly directed nozzles 11 from which the lifting air jets—shown as arrows 12—exit. By means of a suitable automatic control, it can be ensured that the lifting effect of lifting blowers 9 is distributed uniformly throughout the circumference so that during the flight, platform 7 remains substantially horizontal. When platform 7 has a diameter of approximately 3 m, it is possible, in the assembly shown, to accommodate lifting blowers 9 that have enough power to lift and to allow at least one person in cupola 8 to fly. The circular cross section of platform 7 and the number of nine lifting blowers 9 are simply features of the practical example but are not compulsory.

The person in cupola 8 has available a hand-operated control device 13, indicated by the broken lines FIG. 2, so as to control the power output of the blowers 9 and thus the rising and lowering of the flying unit. The person can also determine the direction of travel, either by suitably influencing the lifting blowers 9 or by additional horizontally effective nozzles (not shown in the drawing).

If the lifting units 10' of flying unit 10 are lifting blowers 9, these lifting blowers can be electrically driven, with the current being supplied by suitable detection loops in hall 100, 200,300 so that the free mobility of flying unit 10 within hall 100,200,300 is maintained.

The lifting blowers 9 can, however, also be driven by means of fuel-burning motors, which decreases the constructional volume. It is also possible to use some type of rocket booster instead of the lifting blowers 9.

Details of the technical design of flying unit 10 are intended only as practical examples. What is important is the idea to allow such flying units 10 to fly freely around a hall 100,200, 300, such as is suggested for hall 100 in FIG. 3.

In the free inside space 20 of hall 100, several flying units 10 can fly around freely. In FIGS. 3 and 4, flying units 10 are shown in simplified form in contrast to their representation in FIG. 2.

Hall 100 has the boundaries shown in FIG. 1a, which may be made of, e.g., of a metal wire lattice so as to allow the flying person a view of the outside and thus provide a better flying sensation.

On the inside, hall 100 is divided into three zones 23,24,25 by means of additional boundaries 21,22. The lowermost zone 23 is close to the ground and intended for beginners. Each flying unit 10 has a position-detection device that interacts with a remote control device 26 that is able to identify the various flying units 10 and monitor the presence in the intended zone 23, 24 or 25. If the boundary of the zone for that permission is given is crossed or if technical problems arise, any flying unit can be returned to the ground by means of the remote control device 26, which has priority over the hand controlled device 13 (FIG. 2).

In addition to the control via the remote control device 26, distance sensors 27 (FIG. 2) can be disposed on the individual flying units so as to avoid collisions with other flying units 10 or with the boundaries 3,4,5,6 of the hall.

Boundaries 21,22 that separate zones 23,24,25 on the inside 20 of hall 100 from one another can be "electronic walls." But if boundaries 21,22 are mechanical boundaries in the form of wire lattice walls, access to zones 24,25 is provided by an elevator 28 that transports a flying unit 10 into one of the higher-lying zones 24,25 and places it into the desired zone. It is, however, also possible for flying units 10 to be first hoisted to the higher-lying zones 24,25 by means of a cable and to release the connection only once the flying unit involved is airborne. Such a cable connection also makes it possible to secure flying unit 10 during the start-up phase and to avoid a crash if the necessary lifting power were not available.

While halls 100,200 have a convex shape on all sides, "hall" 300 in FIG. 5 is one that comprises an assembly 40 of flying tunnels 30. Flying tunnels 30 are tubular structures, the walls of which can be formed by closed physical boundaries similar to those of hall 100 by, e.g., wire lattice or plastic panels. But it is also possible to use "electronic walls" for flying tunnels 30. The inside cross section of flying tunnels 30 is predominantly convex and of a size that allows the flying units 10 to fly free from obstructions. To avoid a collision with the boundaries, the inside diameter of a flying tunnel 30 should be approximately five- to twenty-times larger in all directions than the diameter of the flying unit 10.

The simplest embodiment of a flying tunnel assembly is a straight, horizontal flying tunnel that can be traversed in flight on a straight path, for example, inside a relatively large rectangular hall 100 or from such a hall into another such hall 100.

The next stage would be a flying tunnel in the form of a ring that allows the flying unit 10 to follow a closed self-looping path.

FIG. 5 shows a considerably more complex flying tunnel assembly 40 that also includes upward slopes and that allows travel on an extensive and highly varied route. In zone 31, three segments of flying tunnel 30 operate on several levels one on top of the other. In zone 32, flying tunnel 30 forms a helical path from that flying tunnel 30 turns into a type of cupola 33 forming a "hall" that is convex on all sides. In zone 34, flying tunnel 30 takes a considerable upward slope of approximately 45°.

The flying tunnel assembly 40 is supported by portal-like supporting structures 35. Although it is spatially relatively large, it can be easily implemented since the flying tunnel assembly 40 has only a boundary function and does not need to support anything other than its own weight.

The invention claimed is:

1. A flying arrangement, comprising:
   a non-pressurized hall with boundaries;
   at least one flying unit that can accommodate at least one person, the at least one flying unit comprising means for flying freely within the hall;
   at least one control means; and
   a tunnel assembly including self looping flying tunnels providing a closed path through which the at least one flying unit can move;
   wherein said hall comprises boundary means for allowing said at least one flying unit to fly within the boundaries of said hall; and
   wherein the boundary means and the control means of said flying arrangement prevent said at least one flying unit from leaving said hall and from colliding with said boundaries of said hall without safety risk to the at least one person.

2. The flying arrangement as claimed in claim 1, wherein the flying unit is designed as a flying disk with a platform, in the center of which space for the person is provided and which also includes a lifting unit assembly.

3. The flying arrangement in accordance with claim 2, wherein the lifting units are electrically driven.

4. The flying arrangement in accordance with claim 2, wherein fuel burning motors for driving the lifting units are included on the platform.

5. The flying arrangement in accordance with claim 2, wherein the lifting units are designed in the form of rocket boosters.

6. The flying arrangement as claimed in claim 1, wherein at least one flying unit is equipped with a position-detection device.

7. The flying arrangement in accordance with claim 1, wherein the flying unit comprises a remote control device by which the flying unit can be controlled.

8. The flying arrangement as claimed in claim 7, wherein at least one flying unit has distance sensors that are connected to the remote control device.

9. The flying arrangement in accordance with claim 1, wherein the flying unit can be guided to a landing position on the ground by means of a remote control device.

10. The flying arrangement of claim 1, wherein the at least one flying unit has no inherent buoyancy.

11. The flying arrangement of claim 1, wherein the hall boundaries are at least partially open.

12. The flying arrangement of claim 1, wherein said hall has a horizontal dimension at least 20 times a horizontal dimension of said at least one flying unit, and wherein said hall has a vertical dimension at least 20 times a height of said at least one flying unit.

13. A flying arrangement, comprising:
    a hall with boundaries;
    at least one flying unit that is able to start vertically and that can accommodate at least one person for flying freely within the hall, wherein said hall is designed to allow said at least one flying unit to fly freely and safely within the boundaries of said hall and wherein the boundaries of said hall and the operation of said at least one flying unit are designed to prevent without safety risk said at least one flying unit from leaving said hall and to collide with said boundaries of said hall and, wherein the hall comprises at least two zones;
    a remote control device operative to restrict flying with a flying unit to one of the zones or to certain zones; and
    a tunnel assembly including self looping flying tunnels providing a closed path through which the at least one flying unit can move.

14. The flying arrangement of claim 13, wherein said hall has a horizontal dimension at least 20 times a horizontal dimension of said at least one flying unit, and wherein said hall has a vertical dimension at least 20 times a height of said at least one flying unit.

15. A flying arrangement, comprising:
    a hall with boundaries;
    at least one non-buoyant flying unit comprising:
        a lifting unit assembly with control means for allowing the flying unit to start vertically and to fly freely within the hall, and
        accommodations for supporting at least one person in the flying unit for flying freely within the hall; and
    a tunnel assembly including self looping flying tunnels providing a closed path through which the at least one flying unit can move;
    wherein said hall comprises boundary means for allowing said at least one flying unit to fly within the boundaries of said hall; and
    wherein the boundary means and the control means of said at least one flying unit prevent said at least one flying unit from leaving said hall and from colliding with said boundaries of said hall without safety risk to the at least one person.

16. The flying arrangement of claim 15, wherein the hall is non-pressurized.

17. The flying arrangement of claim 15, wherein the flying unit comprises a flying disk with a platform, the platform including space for the person and a lifting unit assembly.

18. The flying arrangement of claim 15, wherein at least one flying unit is equipped with a position-detection device.

19. The flying arrangement of claim 15, further comprising a remote control device by which the flying unit can be controlled.

20. The flying arrangement of claim 15, wherein said hall has a horizontal dimension at least 20 times a horizontal dimension of said at least one flying unit, and wherein said hall has a vertical dimension at least 20 times a height of said at least one flying unit.

21. A flying arrangement, comprising:
    a non-pressurized hall;
    at least one non-buoyant flying unit comprising:
        means for supporting at least one person in the flying unit, and
        a lifting unit assembly with control means operable by at least one person in the flying unit to allow the flying unit to start vertically and to fly freely within the hall without risking damage to any flying units in the hall or harm to persons in the flying units and without requiring the at least one person in the flying unit to have flight experience or training;

wherein said hall comprises at least one boundary operative to prevent said at least one flying unit from exiting the hall; and a remote control operative to overrule the control means of the at least one flying unit when the flying unit approaches a hall boundary to prevent the flying unit from colliding with said boundary.

22. The flying arrangement of claim 21, wherein the remote control is further operative to overrule the control means of the at least one flying unit when the flying unit attempts to exit a circumscribed area of the hall to prevent the flying unit from leaving the circumscribed area.

* * * * *